United States Patent [19]

Gillen

[11] 4,127,774
[45] Nov. 28, 1978

[54] X-RAY MARKER

[76] Inventor: Jerry Gillen, 1621 LeGaye Dr., Cardiff by the Sea, Calif. 92007

[21] Appl. No.: 807,929

[22] Filed: Jun. 20, 1977

[51] Int. Cl.² .......................................... G03B 41/16
[52] U.S. Cl. ..................................... 250/476; 40/597
[58] Field of Search .................... 250/476; 40/125 CL

[56] References Cited

U.S. PATENT DOCUMENTS

| 2,433,480 | 12/1947 | Rendich | 250/476 |
| 2,649,548 | 8/1953 | Greenberg | 250/476 |
| 4,058,733 | 11/1977 | Stembel | 250/476 |

FOREIGN PATENT DOCUMENTS

| 943,505 | 5/1956 | Fed. Rep. of Germany | 250/476 |
| 1,058,046 | 5/1972 | Fed. Rep. of Germany | 250/476 |
| 589,567 | 11/1924 | France | 40/125 C |
| 309,104 | 5/1937 | Italy | 40/597 |

Primary Examiner—Alfred E. Smith
Assistant Examiner—T. N. Grigsby
Attorney, Agent, or Firm—Duane C. Bowen

[57] ABSTRACT

Plastic, color-coded X-ray marker with a cavity containing mercury. The cavity has deeper central portion and shallower branches, relative to the face of the marker. An X-ray negative shows the mercury in the central portion if the X-ray film was flat when exposed and shows the mercury in one or more branches indicating up and down direction if the X-ray film was upright when exposed. The cavity preferably has an asterisk shape whereby the mercury forms an arrow shape indicating up direction on the negative when the film was upright when exposed. Lead indicia indicated right or left and operator's initials. Markers are secured to film holders by a multiplicity of suction cups.

16 Claims, 10 Drawing Figures

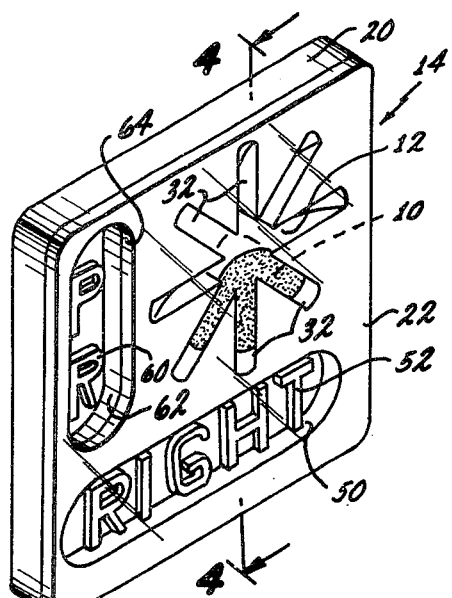
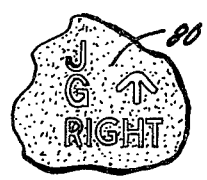
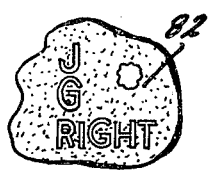
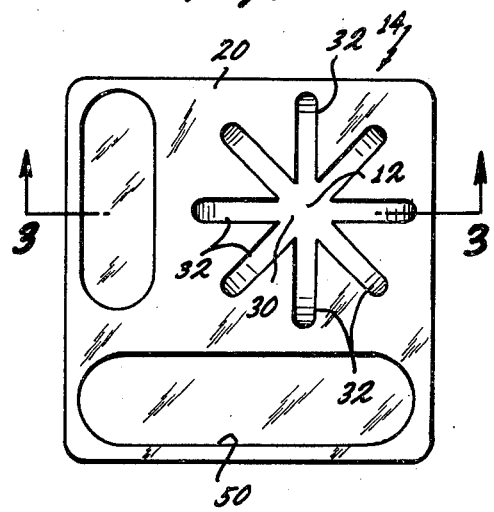
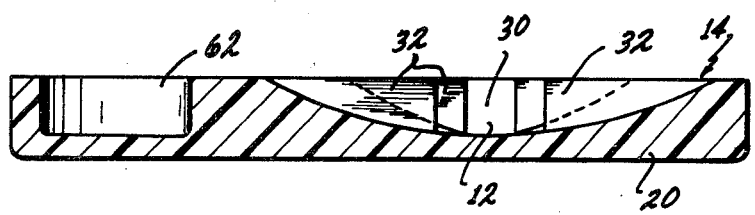
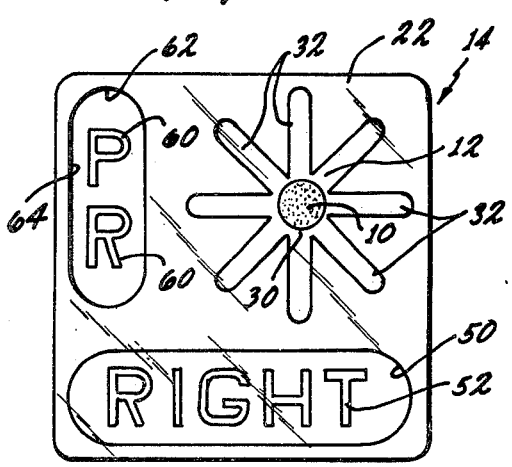
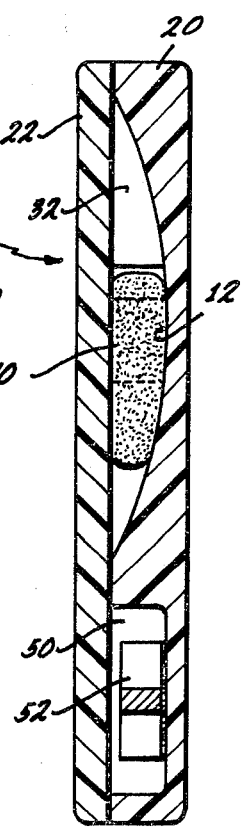

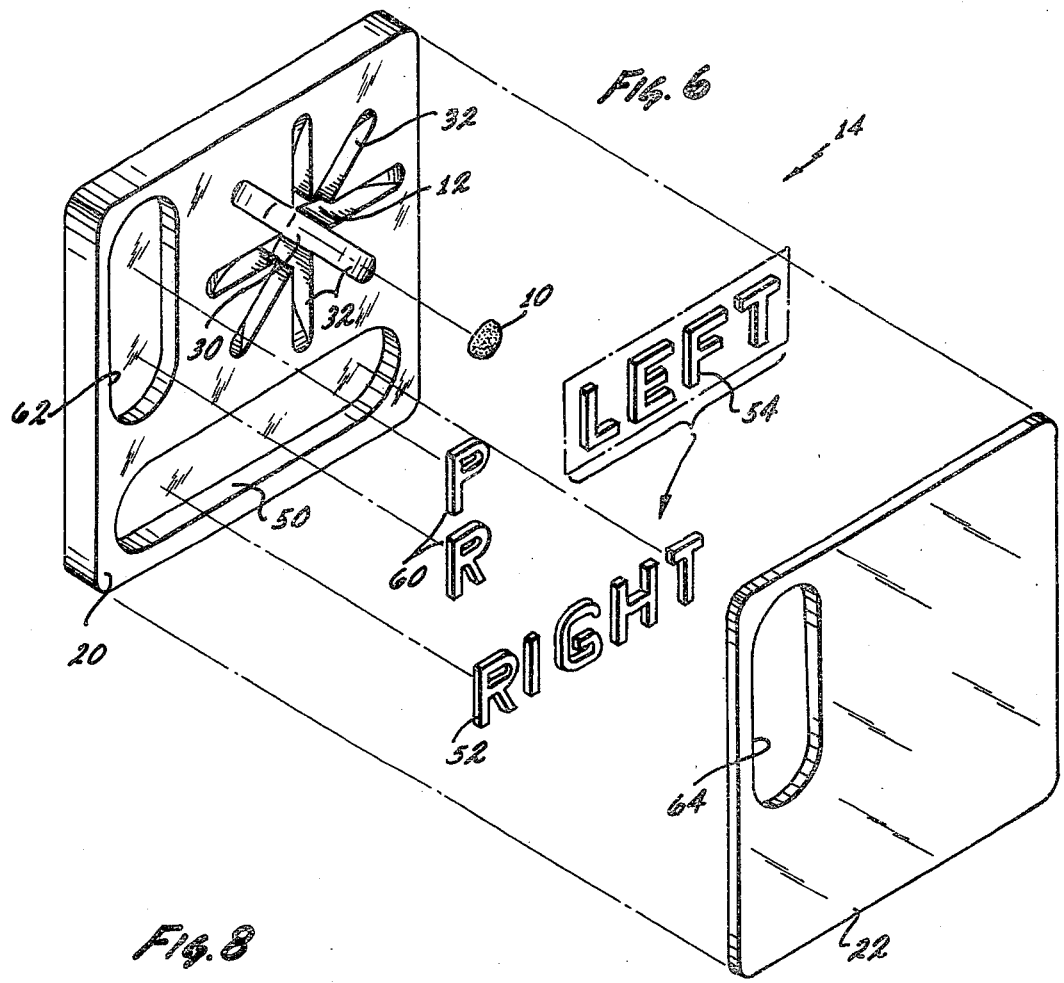
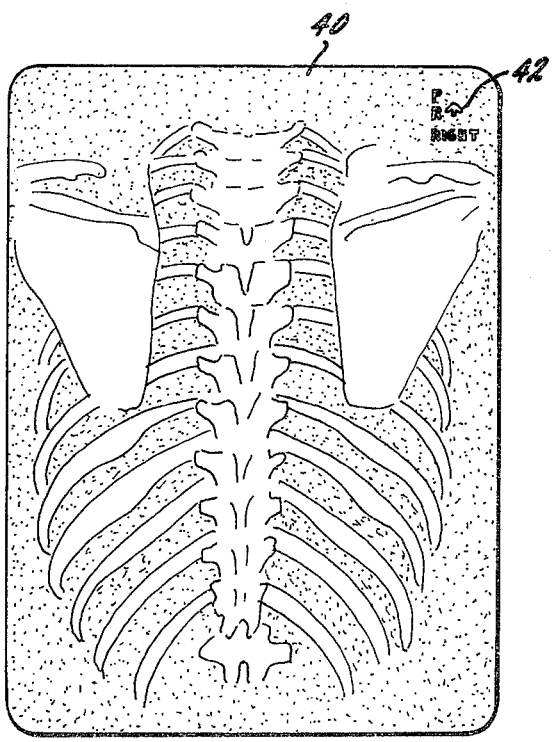
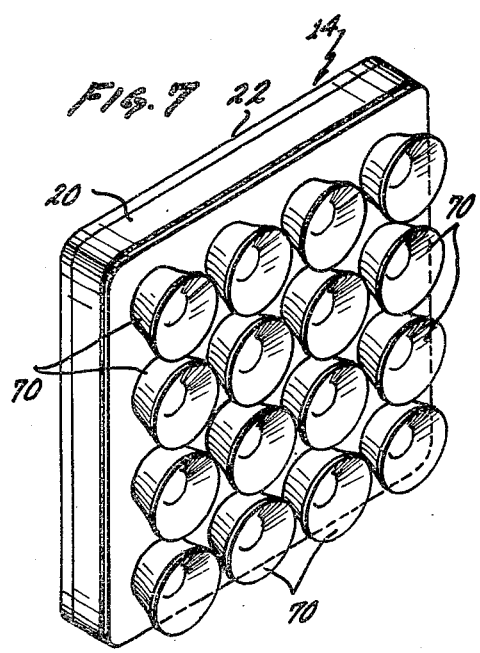

X-RAY MARKER

BRIEF SUMMARY OF THE INVENTION AND OBJECTIVES

My invention relates to X-ray markers indicating disposition of X-ray film when it is exposed by the position of mercury in a cavity preferably of asterisk shape.

Orientation of X-ray films during exposure is important to know when later examining X-ray negatives. Commonly, markers to indicate such orientation, along with patient identification, are taped to film holders, such indicia being formed of X-ray opaque material so as to appear on X-ray negatives. Such practice causes problems if operators make mistakes in choice, operation or disposition of markers indicating orientation.

It will be understood to be preferable for the markers automatically to indicate film orientation, so that indication of orientation would not be subject to operator error. Only one prior device is known by me which automatically indicates orientation. In that device, mercury is disposed in a disc-shaped cavity bounded by a lead circle, which is disposed either between the legs of an "L" or the enclosed lines of an "R," also formed of lead. The letters "L" and "R" indicate right and left sides of the patient. In this prior device, if the mercury is centered in the circle then the film was flat when exposed. If the mercury is at an edge of the circle, then the film was upright when exposed and the mercury is at the "down" edge of the circle. Whereas that prior device automatically indicates film orientation, I feel it would be desirable to more positively indicate up and down directions in a linear manner, as a linear display would be easier to observe and less subject to misinterpretation. It is an objective of my invention to provide such linear display.

The most positive indication of direction is an arrow and it is a further objective of my invention to provide a marker automatically forming an X-ray opaque arrow indicating the "up" direction when the marker is used on a film holder in upright disposition.

Additional objectives of my invention include: to provide an improved X-ray marker; to devise an improved display of film orientation when the marker is exposed and produces an image on the film negative; to provide right and left marking, and operator identification; to provide right and left marker color coding; to device improved means to secure the marker on film holders; to provide an economical, attractive, easily operated and durable X-ray marker; and to provide an improved method of marking X-ray negatives.

My invention will be best understood, together with additional objectives and advantages thereof, from the following description, read with reference to the drawings, in which:

FIG. 1 is a perspective view of a specific embodiment of my new X-ray marker, the marker being in upright position and the mercury in an asterisk-shaped cavity having the outline of an arrow pointed upwardly.

FIG. 2 is a top view of the base of the marker before a cover or resin coat is applied thereto.

FIG. 3 is a sectional view taken on line 3—3 of FIG. 2.

FIG. 4 is a sectional view taken on line 4—4 of FIG. 1.

FIG. 5 is a top view of the assembled marker with the marker lying flat and the mercury therein centered in the asterisk-shaped cavity.

FIG. 6 is an exploded view illustrating the method of assembly of the marker. The presence of the letters spelling "LEFT" in addition to the letters spelling "RIGHT" illustrates that, in the process of assembly, "RIGHT" or "LEFT" would be used depending on which type of marker was being produced.

FIG. 7 is a perspective view of the back of the marker.

FIG. 8 is a face view on an X-ray negative illustrating the type of image that is produced on the negative with use of the marker shown in the other Figures.

FIG. 9 is a fragmentary face view, on enlarged scale, of a portion of an X-ray negative showing an image of an X-ray marker indicating a vertical orientation of marker, film holder and film during irradiation.

FIG. 10 is like FIG. 9, except that the image of the X-ray marker indicates a horizontal or flat orientation of marker, film holder and film during irradiation.

My invention relates to the automatic shaping of a pool of an X-ray opaque liquid 10 in a cavity 12 during use of a marker 14 so as to indicate whether the X-ray film was flat (as in FIG. 5) ot was upright (as in FIG. 1) during irradiation. In the latter case, the opaque liquid 10 also indicates the direction of "up" by the liquid forming an arrow shape, as indicated in FIG. 1.

The only X-ray opaque liquid presently known by me suitable to form pool 10 is mercury, i.e., another liquid I know about which is substantially opaque to X-ray radiation is too viscous for ready shaping in cavity 12. Mercury is substantially non-viscous.

Marker 14 should be transparent to X-rays at least in the area having cavity 12. A suitable selection of material to form marker 14 would be one of a number of applicable plastics substantially transparent to X-ray radiation, and a selection of a plastic for manufacturing purposes can be accomplished by those skilled in the art without specification herein.

Cavity 12 can be molded or milled in the plastic base 20 of the marker, i.e., in larger production quantities molding would be more economical and in smaller production quantities milling would be more economical. Cover 22 bonded to base 20, can be formed from a sheet of material of the same type of plastic as base 20 or of a different X-ray transparent type or instead can be formed by a resin coat.

It is preferred to form cavity 12 in an asterisk shape, i.e., a central broader portion 30 and eight branches 32 extending radially therefrom of narrower width. Note that, whatever the configuration, the mercury 10 has to be of a lesser quantity than the capacity of cavity 12 or else the marker would show the same outline in horizontal or vertical positions, i.e., in an asterisk-shaped cavity the outline produced by the opaque mercury on an X-ray film negative always would be of a complete asterisk shape. Looking at functional shapes generally that would indicate the difference between flat and vertical disposition of marker 14, if there were but a broader area 30 and a single branch 32, the branch would be filled if the branch depended from area 30 in vertical disposition of the marker with the branch showing on an X-ray film negative as a linear shape in the vertical direction. If there were two branches 32 at 90° apart with the median of the angle depending from broader area 30, in vertical disposition of marker 14, a Vee pointing in an upper direction would be formed on an X-ray film negative. If that were duplicated on the other side of area 30 (four branches 32, 90° apart) a Vee pointing in an upper direction would be formed on an X-ray film negative in vertical disposition of marker no matter which side of marker 14 were up. Likewise, if only two diametrically opposite branches 32 were present, extending from opposite sides of the broader central area 30, then one of the branches would be in position to form a linear image on the X-ray film negative when the marker 14 was either in a first vertical position or inverted therefrom. Broadly, the method is to confine the mercury 10 to a substantially circular area 30 when marker 14 is flat and to confine the mercury 10 to at least one linear area 32 having greater length or height than width when marker 14 is vertical, to thereby indicate marker disposition on an X-ray film negative. It will be understood that when marker 14 is secured to the face of an X-ray film holder, an indication of the marker's orientation as to whether it is flat or vertical (and as to what direction is vertical or up in the latter case), will indicate the orientation of the holder and films on the X-ray negative.

Depending on the configuration of cavity 12 and the amount of mercury 10, the depth of cavity 12 is important. It is preferred that the cavity be deeper in the broader central portion 30 and shallower in the branches 32 (as shown in FIGS. 3 and 4) so that the mercury 10 will have a positive gravitational force to cause centering in a flat position of marker 14. Such central disposition of mercury 10 is illustrated in FIG. 5 in which the mercury will show as a circular area on the X-ray film negative when marker 14 (and the film) is flat during irradiation.

It is further preferred that the cavity gradually taper in depth from the deeper central portion 30 toward the shallower ends of branches 32, as shown in FIGS. 3 and 4, which would mean that mercury 10 would tend to gravitate to central area 30 in horizontal disposition of marker 14.

As indicated, the preferred configuration of cavity 12 is an asterisk shape with eight branches 32, 45° apart, with the central portion 30 deeper and with branches 32 shallower and tapering in depth to their ends which are shallowest. In this asterisk shape and with a quantity of mercury 10 preferably only filling all or part of central cavity 30 in horizontal disposition of the marker, (a) as shown in FIG. 5, the mercury 10 automatically will form a dot or circular area in horizontal disposition of the marker, and (b) as shown in FIG. 1, the mercury 10 automatically will form an arrow pointed in the up direction in vertical disposition of marker 14, no matter which side is up. When the marker is juxtaposed to an X-ray film and holder, the X-ray film negative 40 will show an arrow 42 in the up direction (as shown in FIG. 8) when the film was irradiated in vertical disposition. Negative 40 instead would show a dot or circular area at 42 if the marker, film and negative had been horizontally disposed or flat during X-ray irradiation. Indication of the up direction could not be clearer than with an arrow-shape pointed upwardly, as demonstrated by FIGS. 1 and 8.

Those skilled in the art, of course, will understand the importance in reading X-ray film negatives of having a positive, automatic indication (not subject to operator error) of whether the film was flat or whether the film was vertical during irradiation and, in the latter case, which direction is up.

It is also desirable that the marker indicate right and left, meaning an indication of what is right or left on the patient. In the FIG. 8 film 40, the indication of right means that the patient's right is on the right side of the body shot. If the X-ray were taken from the side of a patient, the use of right or left would indicate whether the X-ray was taken from the patient's right or left. It is not new with me to provide "right," "left," "R" or "L" in X-ray opaque material (usually lead) on an X-ray marker although these may not be embedded in the marker in the same way I do. I provide a cavity 50 in the base 20 of marker 14 and bond letters forming the word "RIGHT" or the word "LEFT" 54 in cavity 50. I also prefer to colorcode markers 14 so that the X-ray operator can become used to identifying right and left markers by color as a substitution for or a supplement to reading "right" and "left" from the markers. I have used red-colored plastic for right and green-colored plastic for left.

It is also common to provide operator indication by embedding lead initials in an X-ray marker. I provide such lead initials 60. I have deemed it beneficial to provide for interchange of operator initials, so that new markers 14 would not have to be provided upon change of operators. To achieve this, I provide that initials 60 be bonded in a cavity 62 in marker base 20 and that cover 22 have a matching opening 64, so there will be access to pry out one set of initials 60 and to bond a new set of initials 60 in place of the previous initials.

FIGS. 9 and 10 show images 80, 82 produced on X-ray negatives that are identical except FIG. 9 indicates a vertical orientation of marker, film holder and film during irradiation and FIG. 10 indicates a horizontal or flat orientation.

X-ray markers are usually taped to an X-ray film holder. I have devised a more satisfactory way to secure the markers 14 to such holders. I provide on the back of the marker a multiplicity of small suction cups 70 arranged in rows and files, to secure to the holders by suction. Cups 70 should be made of a material substantially transparent to X-ray radiation. The selection of suitable materials will be understood by those skilled in the art, i.e., from natural rubbers and elastomers.

Having thus described my invention, I do not wish to be understood as limiting myself to the exact details of construction shown and described. Instead, I wish to cover those modifications which will occur to those skilled in the art upon learning of my invention and which are properly within the scope of my invention.

I claim:
1. An X-ray marker, comprising:
   (a) a body having at least an area therethrough formed of material transparent to X-ray radiation,
   (b) said body having a cavity in said area and a liquid opaque to X-ray radiation in said cavity, and
   (c) said cavity having a broader portion and at least one branch transversely narrower than said broader portion branching from said broader portion, said broader portion having greater depth relative to the face of said body than said branch and said liquid being of lesser quantity than would fill both said broader portion and said branch whereby, during use of said marker, an X-ray negative taken with said marker overlying an X-ray film will show said liquid primarily in said broader portion if said film is flat during irradiation and will show said liquid filling said narrower branch if said film is upright during irradiation and said branch depends from said broader portion.
2. The subject matter of claim 1 in which said liquid is mercury.

3. The subject matter of claim 2 in which there are at least two branches from said broader portion.

4. The subject matter of claim 3 in which said two branches are relatively oriented to form a V-angle whereby said two branches from an arrowhead shape to indicate an upward direction when said two branches depend from said broader portion with the median of said V-angle disposed vertically.

5. The subject matter of claim 2 in which there is a series of branches from said broader portion uniformly spaced therearound whereby, when said firm is upright during irradiation, up and down directions can be interpreted from which branches are filled with mercury.

6. The subject matter of claim 5 in which there are eight branches spaced 45° apart in asterisk disposition whereby the lower three branches will form an arrow shape indicating an upward direction when said film is upright during irradiation.

7. The subject matter of claim 5 in which said branches taper in depth to their outer ends which have least depths.

8. The subject matter of claim 5 in which said body is formed of a plastic material including a major base portion in which said cavity is formed and a covering face portion sealing said cavity.

9. The subject matter of claim 8 in which said body has embedded therein X-ray opaque indicia indicating whether right or left and said plastic material being color coded for right or left and said body having an open recess in which there are removably bonded X-ray opaque letters to indicate the operator taking the X-ray.

10. An X-ray marker, comprising:
    (a) a body having at least an area therethrough formed of material transparent to X-ray radiation,
    (b) said body having a cavity in said area and a liquid opaque to X-ray radiation in said cavity, and
    (c) said cavity having a central portion and at least two branches that oppositely branch from said central portion and said liquid being of lesser quantity than would fill said central portion and both of said branches whereby, during use of said marker, an X-ray negative taken with said marker overlying an X-ray film, if said film is upright during irradiation, will show said liquid filling the lower branch to indicate the down direction of the X-ray film.

11. The subject matter of claim 10 in which said liquid is mercury and there are at least four branches spaced 90° apart around said central portion.

12. The subject matter of claim 10 in which said central portion has greater depth relative to the face of said body than said branches which taper in depth to their outer ends which have least depths whereby, during rise of said marker, an X-ray negative taken with said marker overlying an X-ray film, if said film is flat during irradiation, will show said liquid filling said central portion and not filling said branches to indicate the flat disposition of the X-ray film.

13. The subject matter of claim 10 in which said liquid is mercury and there are eight branches spaced 45° apart around said central portion forming an asterisk shape whereby an up direction of X-ray film during irradiation will be indicated on the X-ray negative by an arrow pointed upwardly due to said liquid filling the lower three branches.

14. The subject matter of claim 10 in which there are a multiplicity of small suction cups bonded to the back of said body and operable to secure said body to an X-ray film holder by suction of said cups, said suction cups being formed of material substantially transparent to X-ray radiation.

15. The method of marking an X-ray negative with indicia indicating orientation of the X-ray film during irradiation, comprising:
    (a) providing juxtaposed to an area of said film exposed to irradiation a quantity of mercury,
    (b) confining said mercury to a substantially circular area when said X-ray film is flat during irradiation thereby producing on said negative during irradiation a circular image indicating flat disposition of the film, and
    (c) confining at least part of said mercury in a linear area of greater length than width and with said length oriented vertically when said X-ray film is vertical during irradiation thereby producing on said negative during irradiation a linear image indicating vertical disposition of the film and the direction of vertical.

16. In the method of claim 15, confining part of said mercury in two additional linear areas when said X-ray film is vertical during irradiation, said two additional areas forming with said first mentioned linear area an arrow-shape pointed upwardly thereby producing on said negative during irradiation an arrow-shape indicating an upward direction relative to the film during irradiation.

* * * * *